No. 697,154. Patented Apr. 8, 1902.
E. L. MASON.
STRAINER.
(Application filed Jan. 22, 1902.)
(No Model.)

Witnesses:
Adolph C Kaiser
Fred S. Greenhof

Inventor.
Edward L. Mason,
by Crosby Gregory
attys.

THE NORRIS PETERS CO., PHOTO-LITHO., WASHINGTON, D. C.

UNITED STATES PATENT OFFICE.

EDWARD L. MASON, OF IPSWICH, MASSACHUSETTS.

STRAINER.

SPECIFICATION forming part of Letters Patent No. 697,154, dated April 8, 1902.

Application filed January 22, 1902. Serial No. 90,757. (No model.)

*To all whom it may concern:*

Be it known that I, EDWARD L. MASON, a citizen of the United States, residing at Ipswich, in the county of Essex and State of Massachusetts, have invented an Improvement in Strainers, of which the following description, in connection with the accompanying drawings, is a specification, like letters on the drawings representing like parts.

This invention relating to strainers has for its object to provide a strainer in which the straining-screens may be readily detached from the body of the strainer to be cleansed, it being a great desideratum to provide a strainer in which it is impossible for any impurities to collect.

Figure 1:
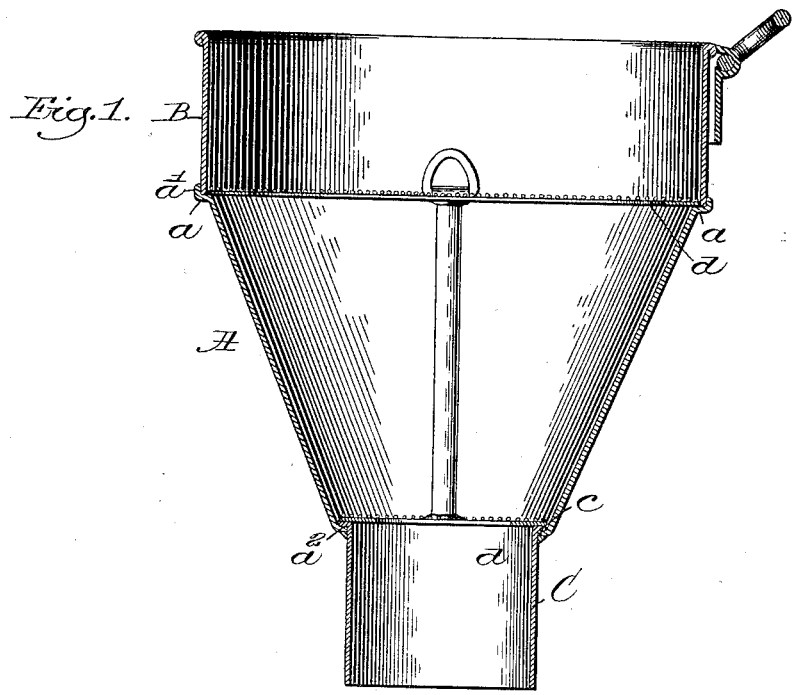
Figure 2:
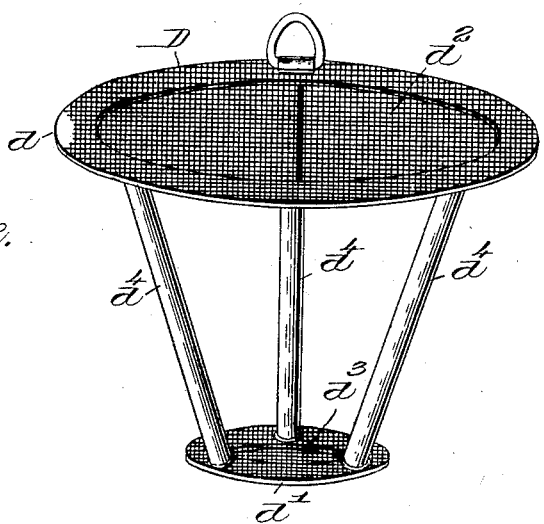

Figure 1 in vertical section shows a strainer embodying my invention, and Fig. 2 shows the screen part thereof removed.

The exterior of the strainer is composed, as shown, of a tapering or conical body A, having its upper end flanged outwardly at $a$ and then turned upwardly at $a'$, the upwardly-turned portion $a'$ embracing and being soldered to a curb B. The lower end of the body A is inturned, as at $a^2$, said inturned end sustaining a flange $c$ of a throat-piece C of suitable shape to enter the mouth of a can or bottle in which the milk from a pail or otherwise may be poured into the can for sale or otherwise. The screen portion or that portion of the strainer that arrests any foreign particles in the milk is composed of two rings $d$ $d'$, each sustaining a screen, as $d^2$ $d^3$, of fine-mesh wire-cloth or any other usual strainer-cloth. The two rings are united by suitable inclined standards $d^4$, secured in any suitable manner to the rings. The distance between the under side of one and the other ring is, as shown, just equal to the distance between the outturned portions $a$ and the shoulder below upon which the ring $d'$ rests, and the shape of the rings for sustaining the screens is exactly the shape in cross-section of the body where the screen is sustained therein. Viewing Fig. 1, it will be seen that the under side of the ring $d$ rests on the flange $a$ of the body, while the ring $d'$ rests on the flanged inner end of the neck C, and both rings are seated firmly in the body of the strainer, so that the milk poured into the inlet or upper end of the strainer will be strained twice before entering the neck. I may, if desired, provide the rods $d^4$ with more than two rings and strainers. After the strainer has been used it has to be cleansed thoroughly, and this will be done by merely removing the screened portion D from the body of the strainer, and the screen may be cleansed by dipping the same in water.

Having described my invention, what I claim as new, and desire to secure by Letters Patent, is—

1. A strainer composed of a body having an inlet end and a connected neck portion, and a screen removably seated within said body and comprising an upper and a lower ring, each sustaining a piece of reticulated material and rods connecting the rings, said body having provisions for engaging the said upper and lower rings for sustaining the screen therein.

2. A strainer comprising a conically-shaped body portion flanged near its larger end and having a neck connected to its opposite end, a screen comprising a plurality of rings spaced apart, each ring being provided with a reticulated fabric, rods connecting said rings, the upper and lower rings adapted to be seated upon the flanged portion and connected neck respectively to sustain the screen in position within the conical body.

In testimony whereof I have signed my name to this specification in the presence of two subscribing witnesses.

EDWARD L. MASON.

Witnesses:
GEO. W. GREGORY,
EDITH M. STODDARD.